(12) United States Patent
De Bie (10) Patent No.: US 9,505,139 B2
(45) Date of Patent: Nov. 29, 2016

(54) LOAD HANDLING ROBOT WITH THREE SINGLE DEGREE OF FREEDOM ACTUATORS

(71) Applicant: Oldin Beheer B.V., Haarlem (NL)

(72) Inventor: Peter Paul De Bie, Amstelveen (NL)

(73) Assignee: Oldin Beheer B.V., Haarlem (NL)

( * ) Notice: Subject to any disclaimer, the term of this patent is extended or adjusted under 35 U.S.C. 154(b) by 53 days.

(21) Appl. No.: 14/179,800

(22) Filed: Feb. 13, 2014

(65) Prior Publication Data

US 2014/0230594 A1 Aug. 21, 2014

(30) Foreign Application Priority Data

Feb. 15, 2013 (NL) ..................................... 2010312

(51) Int. Cl.
*B25J 18/00* (2006.01)
*B25J 9/06* (2006.01)
*B25J 9/00* (2006.01)

(52) U.S. Cl.
CPC ............... *B25J 18/00* (2013.01); *B25J 9/0051* (2013.01); *B25J 9/0084* (2013.01); *B25J 9/0093* (2013.01); *Y10S 901/19* (2013.01); *Y10T 74/20305* (2015.01)

(58) Field of Classification Search
CPC ...................................................... B25J 18/00
USPC ................. 414/729, 737; 74/490.01, 490.03, 74/490.06, 490.3, 490.5, 490.6; 901/27, 901/16, 23
See application file for complete search history.

(56) References Cited

U.S. PATENT DOCUMENTS

| | | | | |
|---|---|---|---|---|
| 4,946,337 A | * | 8/1990 | Tonai et al. | 414/744.5 |
| 6,543,987 B2 | * | 4/2003 | Ehrat | B25J 15/0616 414/729 |
| 8,181,551 B2 | * | 5/2012 | Breu | B25J 17/0266 74/490.01 |
| 8,272,290 B2 | * | 9/2012 | Zhang | B25J 9/107 74/490.01 |
| 8,967,015 B2 | * | 3/2015 | Monti | B25J 17/0266 74/490.01 |
| 2003/0064816 A1 | * | 4/2003 | Schuler | B25J 17/0266 464/102 |
| 2004/0103741 A1 | | 6/2004 | Burkert et al. | |
| 2004/0143876 A1 | | 7/2004 | Persson et al. | |
| 2005/0177279 A1 | * | 8/2005 | Osten | B25J 9/1623 700/258 |
| 2006/0182602 A1 | * | 8/2006 | Schuler | B23Q 1/5456 414/735 |
| 2010/0005919 A1 | * | 1/2010 | Breu | B25J 17/0266 74/490.05 |
| 2010/0101359 A1 | * | 4/2010 | Breu | B25J 17/0266 74/490.06 |

(Continued)

FOREIGN PATENT DOCUMENTS

DE 69714715 T2 4/2003
EP 1125693 A1 8/2001

(Continued)

OTHER PUBLICATIONS

Choi et al.; "Design and Control of a Novel 4-DOFs Parallel Robot H4"; Proceedings of the 2003 IEEE Int'l Conferences on Robotics & Automation; Taipei, Taiwan; Sep. 14-19, 2003; pp. 1185-1190.

(Continued)

*Primary Examiner* — Paul T Chin
(74) *Attorney, Agent, or Firm* — The Webb Law Firm (57) ABSTRACT

A robot for handling loads, comprising an end effector, three actuators, each with a single degree of freedom, three arms, each of them pivotably connected to an actuator and on the other side pivotably connected to the end effector, a frame carrying the actuators; and a control unit connected to the actuators. Also, an assembly of plural of these robots.

14 Claims, 7 Drawing Sheets

(56) References Cited

U.S. PATENT DOCUMENTS

| | | |
|---|---|---|
| 2011/0033275 A1* | 2/2011 | Lehmann ............ B25J 15/0616 414/737 |
| 2011/0097184 A1* | 4/2011 | Kinoshita et al. ............ 414/589 |
| 2011/0100145 A1* | 5/2011 | Feng .................... B25J 17/0266 74/490.01 |
| 2011/0113915 A1* | 5/2011 | Zhang ................. B25J 17/0266 74/490.01 |
| 2011/0129323 A1* | 6/2011 | Ehrat ........................... 414/738 |
| 2011/0132131 A1* | 6/2011 | Worz .................... B25J 9/1623 74/490.05 |
| 2012/0079908 A1* | 4/2012 | Long ........................ 74/490.05 |
| 2012/0272773 A1 | 11/2012 | Monti |
| 2013/0017050 A1* | 1/2013 | Fukudome et al. .......... 414/729 |
| 2013/0209209 A1* | 8/2013 | Fukudome et al. ........... 414/729 |
| 2014/0331806 A1* | 11/2014 | Nagatsuka ................. 74/490.01 |

FOREIGN PATENT DOCUMENTS

| | | |
|---|---|---|
| EP | 1424161 A1 | 6/2004 |
| EP | 2517841 A1 | 10/2012 |
| WO | 9830367 A1 | 7/1998 |
| WO | 03059581 A1 | 7/2003 |

OTHER PUBLICATIONS

Pierrot at al. "H4 Parallel Robot: Modeling, Design and Preliminary Experiments"; Proceedings of the 2001 IEEE Int'l Conferences on Robotics & Automation; Seoul, Korea; May 21-26, 2001; pp. 3256-3261.

* cited by examiner

LOAD HANDLING ROBOT WITH THREE SINGLE DEGREE OF FREEDOM ACTUATORS

CROSS-REFERENCE TO RELATED APPLICATION

This application claims priority to The Netherlands Patent Application No. 2010312 filed Feb. 15, 2013, the disclosure of which is hereby incorporated by reference in its entirety.

BACKGROUND OF THE INVENTION

Field of the Invention

The present invention relates to a robot for handling loads, comprising an end effector, three actuators, each actuator designed for initiating a movement with a single degree of freedom, three arms, each of the arms on one side pivotably connected to a different actuator and on the other side pivotably connected to the common end effector, a frame carrying the actuators; and a control unit connected to the actuators. The present invention also relates to an assembly of plural of these robots.

Description of Related Art

Robots of this type are also known as "delta robots" and are specific designed for manipulating relative light and small objects at a high speed. Use is made of delta robots in industrial environments to handle products, for instance in selection and packaging of products. Normally in such circumstances the frame and actuators, also referred to as the robot's base, is mounted above a workspace. From the actuators three arms extend downwards and at the ends of the arms a manipulator is held. The manipulator is also referred to as end effector. The actuators move the end effector via the arms along the X, Y and Z direction. As the actuators are mounted to the frame and can thus be stationary the arms can be made of a light material, e.g. a composite material. As a result of this the robot can be constructed so that the moving parts have a small inertia. This allows the end effector to be moved with high speed and high acceleration. Such a delta robot is for instance known from US 2004/143876.

Such a robot is also known from WO 03/059581, which describes an industrial robot for moving an object on a platform in space. The robot is thereto provided with three rotatable arms, wherein the axis of rotation of the three arms lies essentially in the same plane. Such arrangement of arms allows the platform to be moved in a relative small area.

EP 1 125 693 describes a parallel kinematic system to move an end effector by at least two actuators. The actuators of EP 1 125 693 are mounted on a frame along which the actuators move in vertical direction. Such arrangement allows a working area inside the frame.

EP 2 517 841 describes a device for moving and positioning a member in space. The device thereto comprises a frame, along which two actuators can slide, and a rotating actuator, which actuators are connected to the member in order to move the member in space. The vertically oriented frame limits the area in which the member can be positioned, since the two sliding actuators can only be moved in vertical direction.

The object of the present invention is, to provide a robot of the delta type that can be used more efficient than the prior art delta robots while at least maintaining the effectiveness of the prior art delta type robots.

SUMMARY OF THE INVENTION

To realise the enhanced efficiency the invention provides a robot for handling loads comprising an end effector, three actuators, each actuator designed for initiating a movement with a single degree of freedom, three arms, each of the arms on one side pivotably connected to a different actuator and on the other side pivotably connected to the common end effector, a frame carrying the actuators, and a control unit connected to the actuators, whereby at least two of the actuators are rotary actuators, connected to the frame with their axes of movement substantially parallel to each other, whereby the axis of movement of one of the actuators is lying outside and nonparallel to a plane through the substantially parallel axes of movement of the other actuators. Traditionally the actuators are positioned in a triangle setting with equal angles between the axes of movement of the three actuators. An advantage of the robot construction according the present invention is that the field of activity, also referred to as the "working volume", of the end effector changes compared to the prior art robots of this type. Instead of the field of activity of the end effector having a circular projection to a working surface the comparable field of activity of the end effector of the robot according the present invention has a more oval shape. In more detail the working surface in this respect is in a specific embodiment parallel to the plane through the substantially parallel axes of movement has a oval shape. In practise such oval shaped field of activity of the end effector is often more suited for the purposes the robot is used. E.g. in practise these robots are often used for picking up articles from a conveyor belt and moving them sideward to put them in or on a product carrier as for instance a packing. Such handling requires a field of activity that is normally wider than long (compared to for instance the conveyor belt as mentioned before). Even more: the field of activity of the handling ideally is in the centre of the oval is larger (higher) than in the outskirts of the oval. The robot according the present invention fits such handling requirements better than the prior art robots of this type.

The actuators with parallel axes of movement are in rotary actuators with or without reductions (direct drive) and the arms connected to the rotary actuators can be pivotably connected to the actuator at a distance of the axis of rotation.

The axis of movement of one of the actuators is lying outside a plane through the substantially parallel axes of movement two of the other actuators. As in the traditional robots the manipulators were place in a common plane the present invention enables it also for instance to put one manipulator (especially the manipulator with the non-parallel axis of movement above or under the other two manipulators with the substantially parallel axes of movement. This further enhances the compactness of build and enables close assembly of plural of these robots. In such build the distance of the actuators with the substantially parallel axes of movement to the end effector will be different from the distance of the third actuators to the end effector. In case the third manipulator is placed above the two manipulators with substantial parallel axes of movement the two actuators with the substantially parallel axes of movement will be closer to the end effector than the third actuator thus also the arms connecting to the two manipulators with substantial parallel axes of movement will have to be shorter than the arm of the third ("non-parallel") manipulator.

A further advantage of the robot according the present invention is that the specific orientation of the manipulators of the robot enable a compactor assembly of the combined manipulators. Instead of the traditional triangular orientation now other builds are also possible that can be compact in one or more directions dependent on the specific requirement in which the robot is to be used. The change in field of activity and the change in the possibilities of assembly of the manipulators enable also a different (more compact) assembly of plural cooperating robots. This will be elucidated later in more detail.

In yet a further embodiment for controlling the orientation of the end effector at least one of the actuators is connected with dual arms to the end effector. Use of parallelograms in arms connecting one or more of the manipulators to the end effector enables to maintain the orientation of the end effector, e.g. to keep it in a horizontal orientation. The use of parallelograms also enable to restrict the movement of the end effector to a pure translation so also without orientations. The arms can be connected to the end effector with universal joints.

The actuators with their axes of movement substantially parallel to each other are ideally fully parallel to each other but the effect sought for can also largely be realised when the angle enclosed between the substantially parallel axes of movement of two of the actuators is in the range of 0°-20°, preferably in the range of 0°-15°.

The end effector is normally provided with a handling element. The choice of the specific type of handling element is dependent of the required handling specifications. The handling element may be a passive element (e.g. a pusher) but it is also possible that the end effector carries an active handling element (e.g. a gripper) that is separately controlled, preferably also by the control unit. To realise such independent control a wireless control can be used but also a wired control line connecting to the end effector can be used.

The invention also provides an assembly of plural robots as specified above which robots are positioned together wherein the field of activity of their arms and/or end effectors (handling elements) is overlapping or separated from each other. The combined robots can in such embodiment be considered as a modular handling system that can be expanded to a capacity, thus a number of robots, as required in a specific situation. To prevent the arms and/or end effectors of the robots to collide (even when they are centrally controlled) these arms and/or end effectors (handling elements) can be separated from each other such that they can never contact so their fields of activity are not overlapping. To make the assembly of robots as compact as possible the distance of the fields of activity of the arms and/or end effectors (handling elements) of two adjoining robots is less than 0.1 m, preferably less than 0.05 m.

When the field of activity of their arms and/or end effectors (handling elements) is overlapping a central controller can be used such that the arms and/or end effectors will not collide during use.

In a specific embodiment the assembly of robots also comprises at least one conveyor and the robots are positioned above and in line with at least one conveyor belt. In such configuration the advantage of the relative dense combination of the robots is made use of as here above a specific part of the conveyor (e.g. a belt conveyor) the handling capacity of the robot assembly according the present invention can be higher than the handling capacity of a robot assembly according the prior art. Also, when the same handling capacity compared to the prior art robot assembly is required, this can be achieved with the same amount of robots, where each robot requires less space compared to the prior art robot. Therefore resulting in a reduction of the footprint of the robot assembly.

BRIEF DESCRIPTION OF THE DRAWINGS

The present invention is further elucidated on the basis of the non-limitative exemplary embodiment shown in the following figures. Herein shows.

DESCRIPTION OF THE INVENTION

Figure 1A:
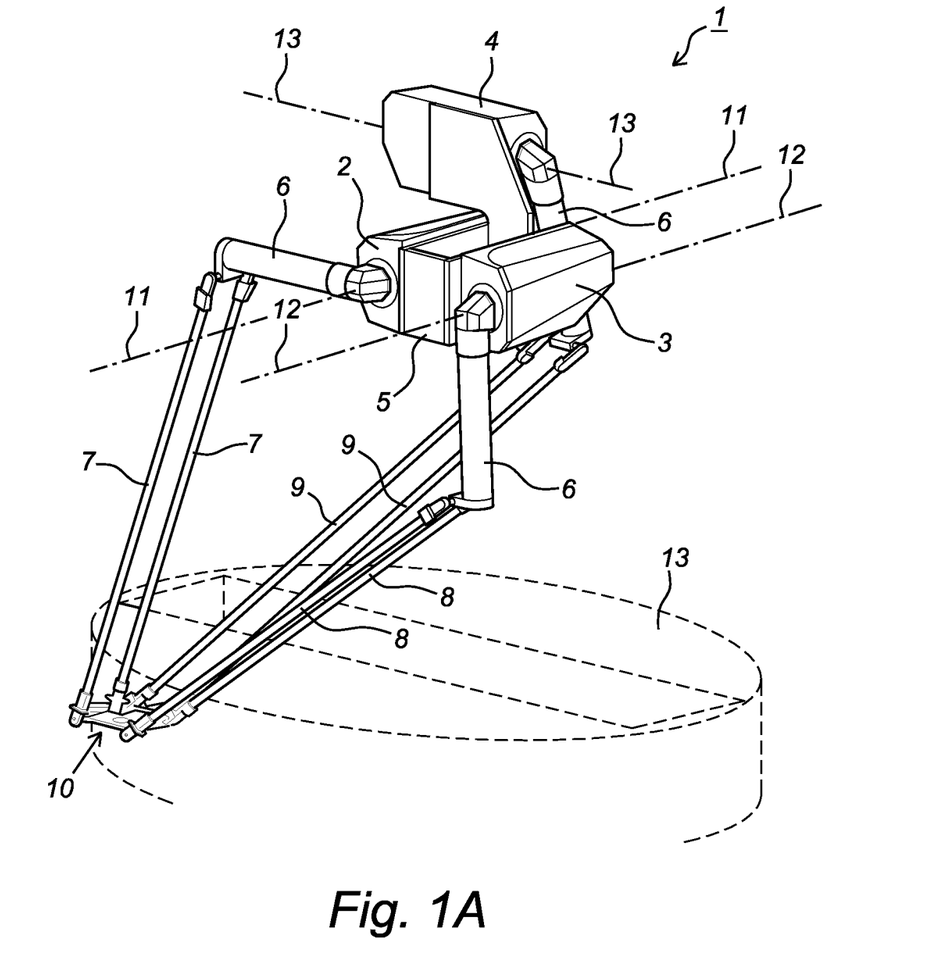
FIG. 1A a perspective view on a robot according the present invention.
Figure 2:
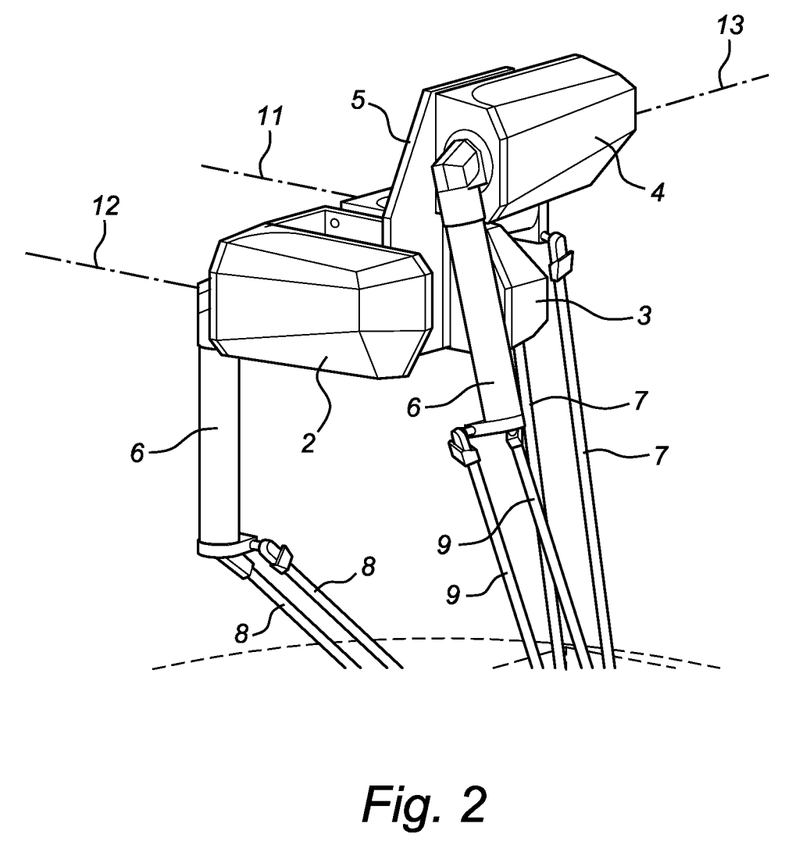
FIG. 2 a perspective view on a part of the robot as shown in FIG. 1 from a different point of view.

FIG. 1A shows a delta robot 1 according the present invention with three rotary actuators 2, 3, 4 that are mounted on a robot frame 5. The rotary drives 2, 3, 4 all have a crank 6 that is rotated for changing the position of the dual arms 7, 8, 9 connected to these cranks 6. The dual arms 7, 8, 9 are all connected to an end effector 10. The arms 7, 8, 9 are all double constructed as this enables to control not only the position but also the orientation of the end effector 10. Here the end effector 10 is embodied as a platform. As also illustrated in FIG. 2 the rotary actuators 2 and 3 are connected to the frame 5 with their axes of movement 11, 12 parallel to each other. The parallel axes of movement 11, 12 of two of the actuators 2, 3 results in a field of activity 13 of the end effector 10 that has a oval shape.

Figure 1B:
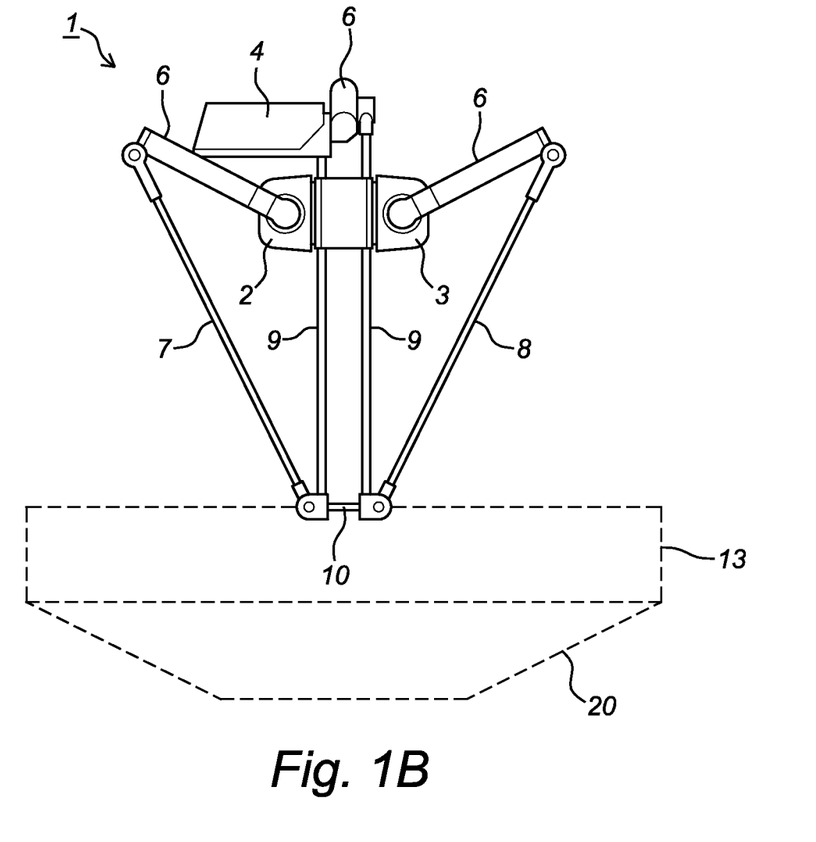
FIG. 1B a side view of the robot of FIG. 1.

FIG. 1B shows the delta robot 1 wherein the field of activity 13, also referred to as the "working volume", of the end effector 10 is further indicated. The oval shape as shown in FIG. 1A reduces in size when the effector 10 reaches lower, as indicated by the tapered field of activity 20.

Further attention is drawn to the position of the third rotary actuator 4 being located above the "parallel" lower rotary actuators 2, 3. Such positioning of the actuator 4 enables a compact build of the frame/actuator assembly 2,3,4,5. An axis of movement 13 of the higher rotary actuator 4 is perpendicularly intersecting the axes of movement 11, 12 of the two lower actuators 2, 3. The arms 7, 8 connecting to the two lower actuators 2, 3 are shorter than the arms 9 connected to the higher actuator 4.

Figure 3A:
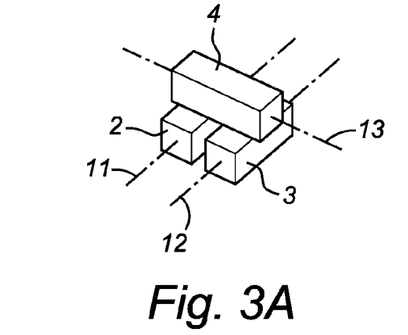
FIGS. 3A-3G schematic views on the orientation of the actuators of a robot according the present invention.

FIG. 3A shows a schematic view on the orientation of the actuators 2, 3, 4 of the robot 1 as shown in FIGS. 1 and 2. Also the axes of movement 11, 12, 13 of the actuators 2, 3, 4 are shown in this figure.

Figure 3B:
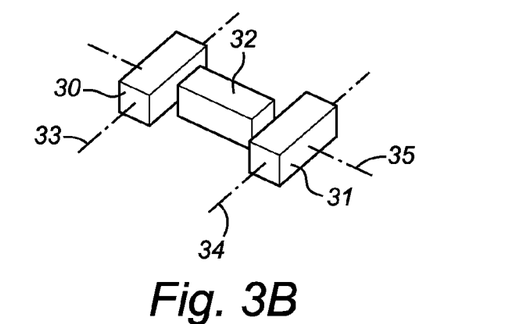

In line with the schematic view of FIG. 3A in FIG. 3B is an schematic view shown on an alternative orientation of actuators 30, 31, 32 with axes of movement 33, 34, 35. Here the axes of movement 33, 34 of the actuators 30, 31 are parallel but now the axis of movement 35 of the actuator 32 is crossing the axes of movement 33, 34 of the actuators 30, 31. The actuators 30, 31, 32 are all placed in a single plane. Also this first alternative configuration of the actuators 30, 31, 32 is part of the present invention. A choice for the orientation as shown in this figure can for instance be made in case there is limited space in height on the location where a delta robot is to be placed but still the advantages of the present invention are sought for.

Figure 3C:
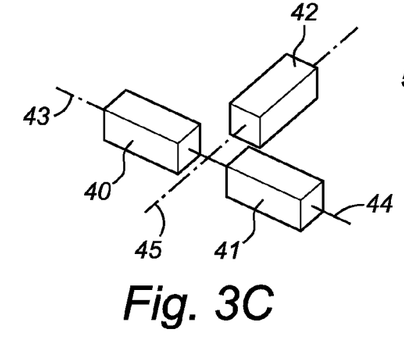

In FIG. 3C a second alternative orientation of actuators 40, 41, 42 with axes of movement 43, 44, 45 is shown. Here the axes of movement 43, 44 of the actuators 40, 41 are placed in line (and are thus also parallel). The axis of movement 45 of the actuator 42 is crossing the axes of movement 43, 44 of the actuators 40, 41.

Figure 3D:
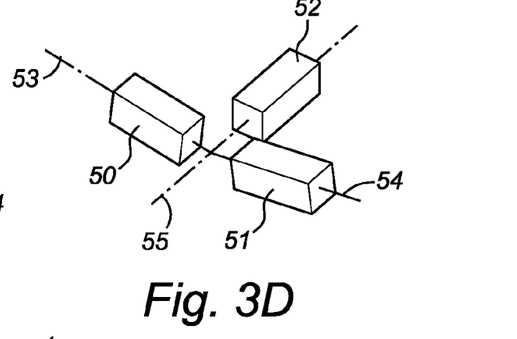

In FIG. 3D a third alternative orientation of actuators 50, 51, 52 with axes of movement 53, 54, 55 is shown. Here the axes of movement 53, 54 of the actuators 50, 51 are placed substantially in line (and are thus also substantially parallel). The angle enclosed by the axes of movement 53, 54 of the actuators 50, 51 is less than 20°, preferably less than 15°, even more preferably less than 10°.

Figure 3E:
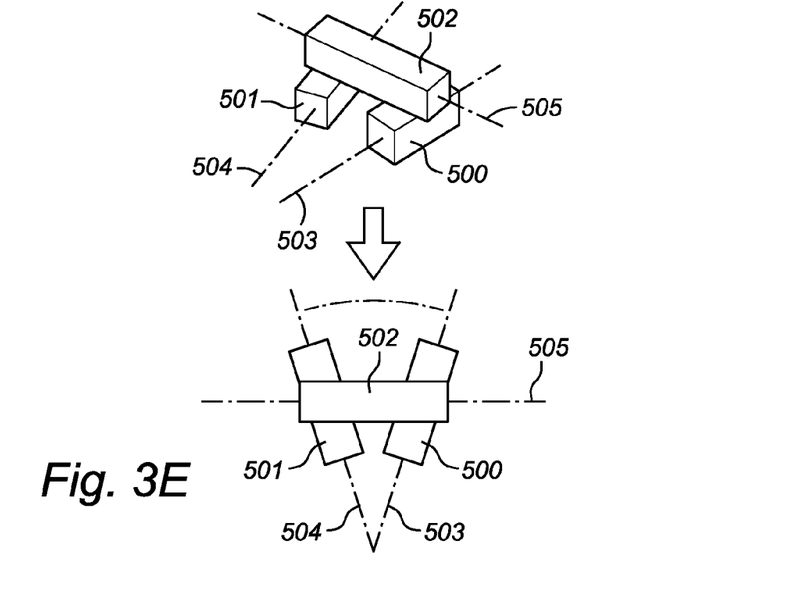

In FIG. 3E a fourth alternative orientation of actuators 500, 501, 502 with axes of movement 503, 504, 505 is shown. Here the axes of movement 503, 505 of the actuators 500, 502 are placed substantially in line (and are thus also substantially parallel). The angle enclosed by the axes of movement 503, 505 of the actuators 500, 502 is less than 20°, preferably less than 15°, even more preferably less than 10°.

Figure 3F:
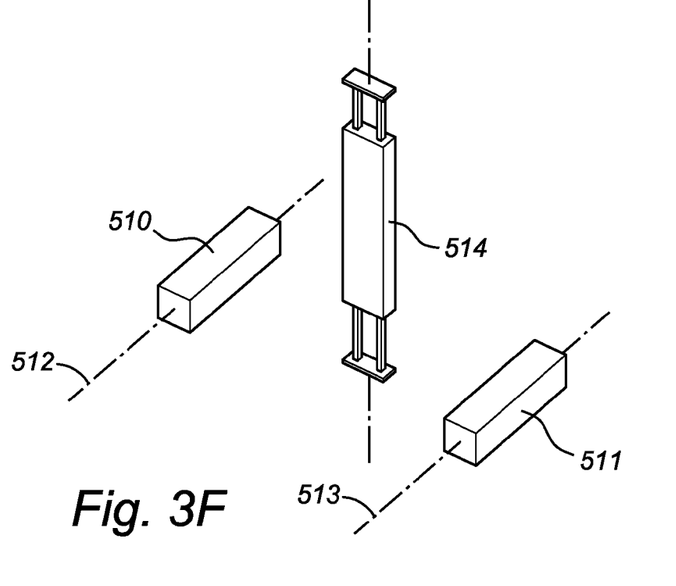

In FIG. 3F a robot according to the invention is shown wherein the actuators comprise two rotary actuators (510, 511) with their axis of movement (512, 513) substantially parallel and one linear actuator (514). The use of linear actuators may save space, resulting in the possibility of placing multiple robots closer together.

Figure 3G:
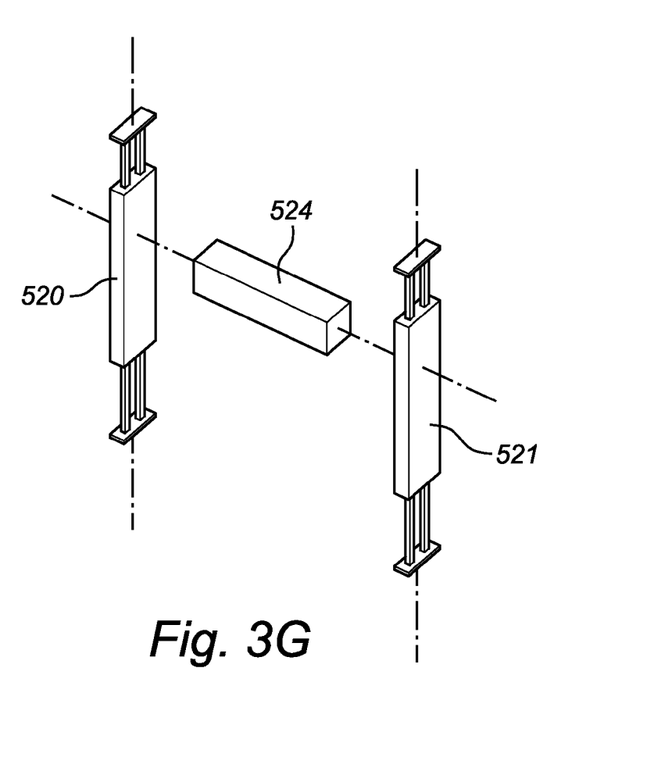

FIG. 3G discloses a robot according to the invention wherein the actuators comprise two linear actuators (520, 521) with their axes of movement (522, 523) substantially parallel and one rotary actuator (524). The use of linear actuators may save space, resulting in the possibility of placing multiple robots closer together.

Figure 4:
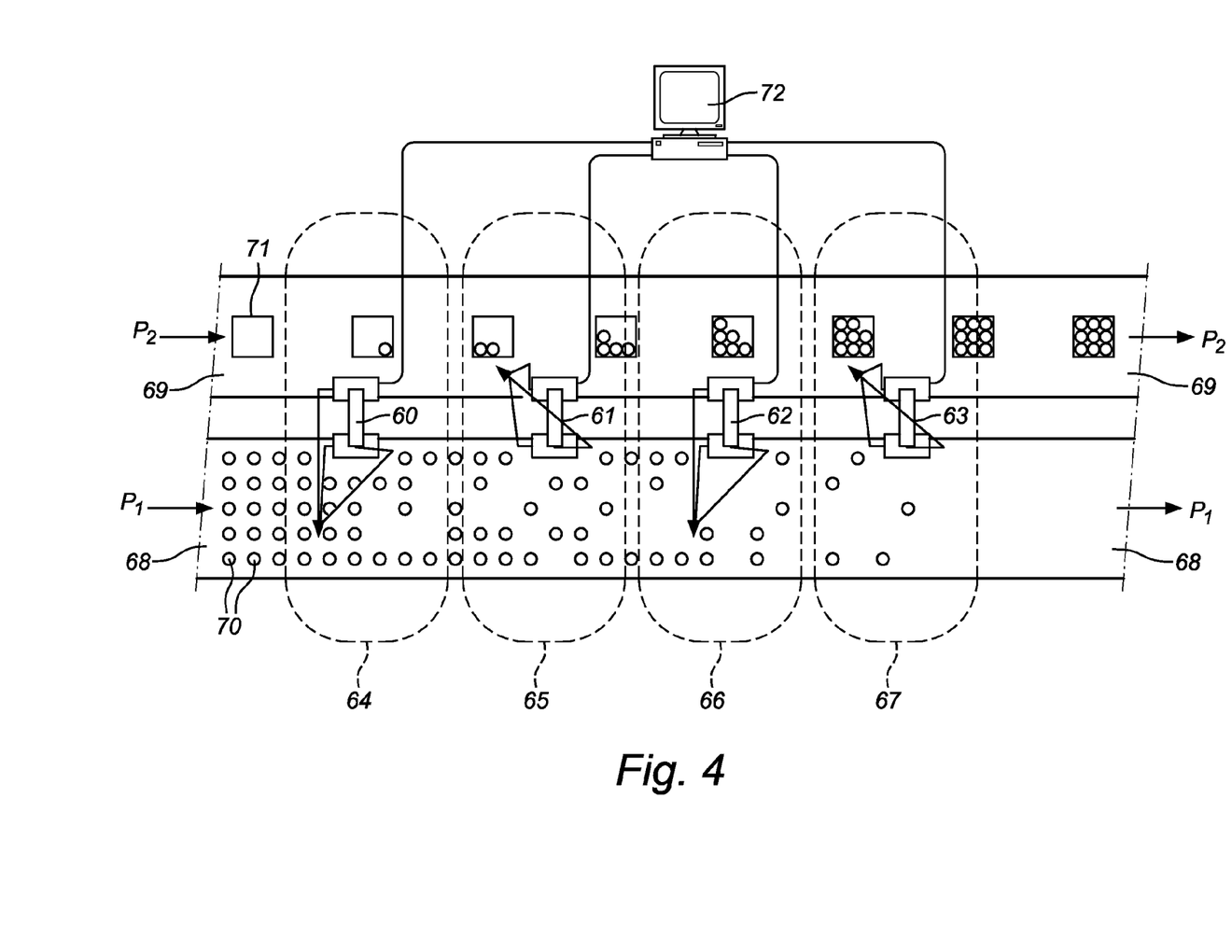
FIG. 4 a schematic top view of an assembly of robots according the present invention.

FIG. 4 shows schematic top view of an assembly of robots 60, 61, 62, 63 according the present invention with their with the fields of activity 64, 65, 66, 67 separated from each other. The robots 60, 61, 62, 63 are located above two conveyor belts 68, 69 moving in the direction as indicated by arrows P1, P2. On conveyor 68 individual products 70 are supplied and the successive robots 60, 61, 62, 63 pick individual products 70 from the conveyor belt 68 and place these individual products 70 in packages 71 as empty supplied by the conveyor belt 69 to be filled after passage of the complete assembly of robots 60, 61, 62, 63 with the individual products 70. As the fields of activity 64, 65, 66, 67 of the robots 60, 61, 62, 63 are separated from each other there is no possibility of undesired interference of the robots 60, 61, 62, 63. Also schematically shown is a common control unit 72 steering the robots 60, 61, 62, 63.

Figure 5:
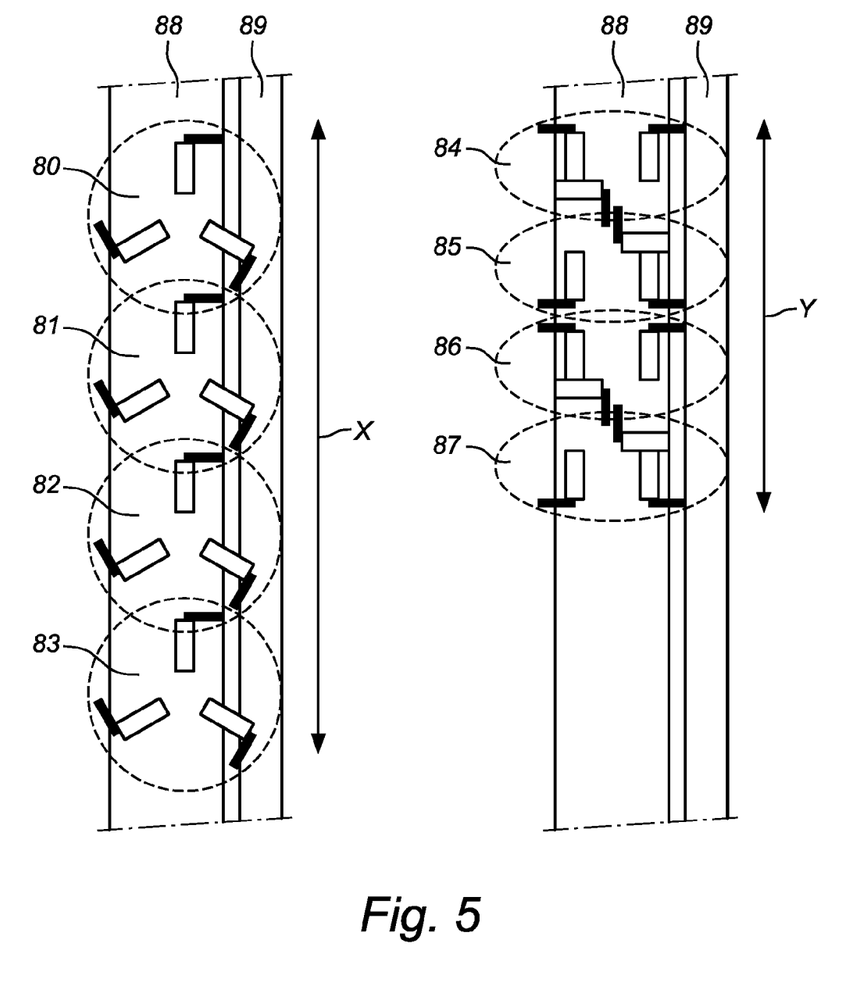
FIG. 5 a schematic top view of an assembly of robots compared to the prior art robots.

FIG. 5 shows a schematic view of an assembly of robots 80, 81, 82, 83 according to the prior art and an assembly of robots 84, 85, 86, 87 according to the present invention which are placed above two conveyor belts 88, 89. The effective placement of the robots of the present invention reduced the required footprint on the factory, as indicated by the difference between X and Y, while maintaining the handling capacity of the assembly.

The invention claimed is:

1. A robot for handling loads, comprising:
   an end effector;
   three actuators, each actuator designed for initiating a movement with a single degree of freedom, and each actuator comprising a crank configured for rotational movement about one end thereof;
   three arms, each of the arms on one side pivotably connected to a respective actuator crank and on the other side pivotably connected to the end effector;
   a frame carrying the actuators; and
   a control unit connected to the actuators;
   wherein at least two of the actuators are rotary actuators, connected to the frame with their axes of movement substantially parallel to each other; and
   wherein the axis of movement of one of the actuators is nonparallel to the substantially parallel axes of movement of the other actuators; and
   further wherein the axis of movement of one of the actuators lies on a first plane different from a second plane of the substantially parallel axes of movement of the other actuators, wherein the second plane is parallel to the first plane.

2. The robot as claimed in claim 1, wherein at least one of the actuators is connected with dual arms to the end effector, for controlling the orientation of the end effector.

3. The robot as claimed in claim 1, wherein the distance of the actuators with the substantially parallel axes of movement to the end effector is different from the distance of the third actuators to the end effector.

4. The robot as claimed in claim 1, wherein the angle enclosed between the substantially parallel axes of movement of two of the actuators is in the range of 0°-20°, preferably in the range of 0°-15°.

5. The robot as claimed in claim 1, wherein the arms connected to the rotary actuators are pivotably connected to the actuator at a distance of the axis of rotation.

6. The robot as claimed in claim 1, wherein at least one of the actuators is a linear actuator.

7. The robot as claimed in claim 1, wherein at the end effector is provided with a handling element, which handling element is controlled by the control unit.

8. The robot as claimed in claim 1, wherein a projection of the field of activity of the handling element to a surface parallel to the plane through the substantially parallel axes of movement has an oval shape.

9. An assembly of plural robots according to claim 1, wherein the robots are positioned together with the field of activity of at least one of their arms and end effectors separated from each other.

10. The robot assembly according claim 9, wherein the distance of the fields of activity at least one of the arms and end effectors of two adjoining robots is less than 0.1 m, preferably less than 0.05 m.

11. The robot assembly according to claim 9, wherein the assembly also comprises at least one conveyor belt and the robots are positioned above and in line with at least one conveyor belt.

12. The robot assembly according to claim 9, wherein the assembly also comprises at least one controller, for controlling the movements of the robots.

13. The robot assembly according to claim 12, wherein the controller is arranged to avoid at least one of the arms and end effectors of the robots from colliding with each other.

14. An assembly of plural robots according to claim 1, wherein the robots are positioned together with the field of activity of at least one of their arms and end effectors overlapping each other.

\* \* \* \* \*